Patented Oct. 22, 1929

1,732,662

UNITED STATES PATENT OFFICE

FRIEDRICH RÜSBERG, OF BERLIN-NIEDERSCHONEWEIDE, AND PAUL SCHMID, OF BERLIN-BAUMSCHULENWEG, GERMANY, ASSIGNORS TO THE FIRM KALI-CHEMIE, AKTIENGESELLSCHAFT, OF BERLIN, GERMANY

RECOVERING ZIRCONIC OXIDE

No Drawing. Application filed October 24, 1928, Serial No. 314,844, and in Germany November 11, 1927.

This invention relates to the recovering of zirconic oxide from the products obtained by calcining zirconic ores with quicklime and coal.

A well-known process for recovering pure zirconic compounds from the said products consists in extracting the material with hydrochloric acid, cooling the resulting hydrochloric solution to precipitate zirconic oxychloride, and then transforming this compound into the desired other zirconic compounds.

This process is subject to several drawbacks mainly consisting in that zirconic oxychloride is liable to undergo crystallization so that it becomes necessary to employ rather diluted solutions from which a quantitative output of zirconic oxychloride cannot be attained. It is true that the output can be increased by employing highly concentrated solutions. The latter, however, are liable to undergo crystallization even when yet hot so that difficulties arise when the crystals are to be separated from the insoluble parts of the material.

Now we have found that the zirconium content of the above-said raw materials can be precipitated in an insoluble form and separated from the other constituents to a satisfactory extent in the following way:—The raw material is extracted with hydrochloric acid, and the hydrochloric solution which contains calcium chloride and in small quantities, ferric and aluminum chloride besides zirconic oxychloride is treated with sulphurous acid or with alkali metal or earth alkali metal sulfites or bisulfites. In this case it is not necessary to keep the hydrochloric acid extracts at a high concentration, as it is possible to separate the zirconium content even from diluted solutions to a satisfactory extent. A precipitate of basic zirconium sulfite of varying composition is obtained which can easily be transformed to zirconic oxide by heating the same to red-heat.

We have further found that on treating the calcined products containing zirconium compounds and lime with aqueous sulphurous acid practically no zirconium enters into solution, but only part of the lime in the form of calcium bisulfite, so that in this way part of the lime may easily be removed from the calcined products. The residue from the extraction which besides lime and silicic acid yet contains the whole of the zirconium is then dissolved in hydrochloric acid and the hydrochloric solution treated with bisulfites as above indicated. Preferably for this purpose a calcium bisulfite solution is used which results from treating the calcined calcium-zirconium compounds with aqeous sulphurous acid. In this case preferably the treatment of the calcined product with aqueous sulphurous acid is conducted in such a way that just that amount of bisulfite is obtained which will be required for precipitating the zirconium present.

The precipitate of basic zirconium sulfite is transformed to zirconic oxide as above described.

Furthermore it has been ascertained that preferably the treatment of the zirconic solution with sulphurous acid or sulfites is carried out in the cold and heat is only gradually applied, as otherwise slimy, difficultly filtrable products are obtained. Furthermore when employing normal sulfites we have found it preferable to acidulate the zirconic solution.

Examples 1. 1 kilogram of a calcined zirconic lime product of the following composition:

| | Per cent |
|---|---|
| CaO | 44 |
| $ZrO_2$ | 38 |
| $SiO_2$ | 10 |
| $Al_2O_3 + Fe_2O_3$ | 7 | is dissolved by introducing the same into 4.15 kilograms of a 20% hydrochloric acid and heating. The solution is filtered off from the residue of silicic acid and the filtrate, after cooling down, is mixed with 1.25 liters of a sodium bisulfite solution of 40° Bé. containing 588 grams $NaHSO_3$ per liter, notwithstanding an eventual separation of zirconium oxychloride. After some standing the solution is gradually heated whereby basic zirconium sulfite is precipitated and sulphurous acid escapes. The zirconium sulfite is separated from the solution, washed out and calcined at about 700 to 800° C. The zirconic oxide thus obtained was free from contaminations.

2. 1 kilogram of the calcined zirconic product was dissolved in hydrochloric acid as in Example 1. The hydrochloric solution was separated from the insoluble residue and mixed with 5.1 liters of a calcium bisulfite solution of 13° Bé. containing 137 grams $Ca(HSO_3)_2$ per liter. The further treatment was the same as in Example 1.

3. 1 kilogram of the calcined product having the same composition as that described in Example 1 was suspended in the form of a powder in 5 liters of water. Into this suspension sulphurous acid gas was introduced until a calcium bisulfite solution of 13° Bé. was formed. The solution was filtered off and the undissolved residue was extracted with 2.6 kilograms of hydrochloric acid of 12° Bé. whilst heating. The hydrochloric acid solution was separated from the insoluble silicic acid and, after cooling down, mixed with the calcium bisulfite solution obtained by treating the calcined product with sulphurous acid. The further treatment was the same as in Examples 1 and 2.

I claim:—

1. The process of recovering zirconic oxide from calcined zirconic lime products which comprises extracting the products with hydrochloric acid, treating the hydrochloric solution with a sulphurous compound, separating the basic zirconic sulfite thereby precipitated, and calcining the said sulfite.

2. The process of recovering zirconic oxide from calcined zirconic lime products which comprises extracting the products with aqueous sulphurous acid, extracting the residue with hydrochloric acid, treating the hydrochloric solution with the calcium bisulfite solution obtained by the first extraction, separating the basic zirconic sulfite thereby precipitated, and calcining the said sulfite.

3. The process of recovering zirconic oxide from calcined zirconic lime products which comprises extracting the products with hydrochloric acid, treating the hydrochloric solution with a sulphurous compound in the cold, gradually heating the solution, separating the basic zirconic sulfite thereby precipitated, and calcining the said sulfite.

4. The process of recovering zirconic oxide from calcined zirconic lime products which comprises extracting the products with aqueous sulphurous acid, extracting the residue with hydrochloric acid, treating the hydrochloric solution in the cold with the calcium bisulfite solution obtained by the first extraction, gradually heating the mixed solutions, separating the basic zincronic sulfite thereby precipitated, and calcining the said sulfite.

In testimony whereof we affix our signatures.

FRIEDRICH RÜSBERG.
PAUL SCHMID.